(12) United States Patent
Fasen

(10) Patent No.: US 6,411,460 B1
(45) Date of Patent: *Jun. 25, 2002

(54) POSTPONABLE SERVO CODE SELECTION

(75) Inventor: Donald J. Fasen, Boise, ID (US)

(73) Assignee: Hewlett-Packard Co., Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/708,763

(22) Filed: Nov. 7, 2000

Related U.S. Application Data

(63) Continuation of application No. 09/046,809, filed on Mar. 23, 1998, now Pat. No. 6,172,837.

(51) Int. Cl.⁷ .............................................. G11B 21/02
(52) U.S. Cl. ........................ 360/75; 360/77.12; 360/57
(58) Field of Search ................................ 360/75, 77.12, 360/57, 77.13, 48

(56) References Cited

U.S. PATENT DOCUMENTS

| | | | | |
|---|---|---|---|---|
| 3,984,065 A | * | 10/1976 | Bosetti et al. ............... 242/183 |
| 5,008,765 A | * | 4/1991 | Youngquist ............... 360/77.12 |
| 5,055,951 A | * | 10/1991 | Behr .................... 360/77.07 X |
| 5,262,908 A | * | 11/1993 | Iwamatsu et al. ........ 360/77.12 |
| 5,432,652 A | * | 7/1995 | Comeaux et al. ........ 360/77.12 |
| 5,450,257 A | * | 9/1995 | Tran et al. ..................... 360/76 |
| 5,452,150 A | * | 9/1995 | Henneberger et al. ..... 360/74.4 |
| 5,572,392 A | * | 11/1996 | Aboaf et al. ................. 360/126 |
| 5,574,602 A | * | 11/1996 | Baca et al. ............... 360/77.12 |
| 5,602,703 A | * | 2/1997 | Moore et al. ................ 360/121 |
| 5,912,778 A | * | 6/1999 | Kalfs et al. ........... 360/77.12 X |
| 5,917,671 A | * | 6/1999 | Kaaden et al. ........... 360/77.12 |
| 5,949,607 A | * | 9/1999 | Kalfs et al. ........... 360/78.12 X |
| 5,982,711 A | * | 11/1999 | Knowles et al. .......... 360/77.12 |
| 6,031,673 A | * | 2/2000 | Fasen et al. ......... 360/77.12 X |

* cited by examiner

Primary Examiner—Andrew L. Sniezek

(57) ABSTRACT

A servo writer for writing servo code to a magnetic tape having a width, the servo writer comprising a tape head including a plurality of write elements and being configured to write servo code to a plurality of bands across substantially the entire width of the tape. A method comprising providing a tape having a width; and writing servo code on the tape using a servo writer configured to transport the tape in a length direction normal to the width, and configured to write servo code in linear bands along the length of the tape, the bands together occupying substantially the entire width of the tape.

11 Claims, 5 Drawing Sheets

POSTPONABLE SERVO CODE SELECTION

CROSS REFERENCE TO RELATED APPLICATION

This is a Continuation of U.S. patent application Ser. No. 09/046,809, filed Mar. 23, 1998, and titled "Postponable Servo Code Selection" now U.S. Pat. No. 6,172,837.

FIELD OF THE INVENTION

This invention relates to recording and reading data from a magnetic media, such as a tape. More particularly, the invention relates to servo systems for use with tape.

BACKGROUND OF THE INVENTION

With increased computerization, more and more sensitive and valuable information is being generated and stored. The need for storage capacity is increasing. Higher capacity backup tapes are demanded.

One method for storing information on magnetic tape uses what is a known as "helical scan" technology. Helical scan tape systems cause information to be recorded in stripes that are diagonal relative to the length of a tape. The helical scan systems use a rotating drum head operating on a slowly driven tape, for high capacity. The tape is wrapped around the rotating drum.

Another method for storing information on magnetic tape uses what is known as "linear recording" technology. Linear recording tape systems cause information to be recorded in multiple parallel tracks that extend in the direction of the length of the tape. Linear recording systems use a stationary head operating on tape that is driven past the head at a speed that is typically much faster than the speed used by helical scan tape systems. With linear recording systems, multiple read/write elements can be employed in a head and can simultaneously operate on the tape.

Continuing advances in magnetic storage technology provide for constantly increasing data storage densities. The more tracks that can be fit across the width of a tape, the more information that can be stored on a tape. Thus, there is a push to increase the number of tracks across the width of a tape and to reduce the width of each track. Increasing the number of tracks or reducing the width of a track makes accurate positioning of read/write elements, and issues of tape wander more important. Therefore, servo systems are desirable in linear drive systems.

Servo systems employ information or patterns recorded along a track of the tape to accurately position read/write elements relative to data on the tape. The servo information can be used to accurately position heads relative to the length of the tape (e.g., when searching for a desired position along the length of the tape, such as the start of a file) as well as relative to the width of the tape. Thus, servo patterns on a tape have a characteristic that changes across the width of the tape.

Various servo systems are known in the art. For example, dual frequency servo schemes are known, in which a pattern is written with one frequency on one side of the servo track, and at a different frequency at the other side of the track. Thus, as a servo element passes over the servo track, lateral position can be determined.

U.S. Pat. No. 5,432,652 (incorporated herein by reference) relates to a magnetic tape that has three evenly spaced-apart longitudinally-extending servo track areas. Four equal-sized longitudinally-extending data track areas are disposed between the servo track areas and between longitudinal edges of the tape and one of said longitudinally-extending data track areas. For track following, all servo track areas are simultaneously sensed for producing one head positioning signal.

U.S. Pat. No. 5,008,765 (incorporated herein by reference) relates to a method for reading or writing data on a tape which has a plurality of data tracks and at least a first dedicated servo track. A multiple channel head is used to access the tracks on the tape. The head is moved proximate one of a plurality of predetermined positions. The channels are located so that, in any one predetermined position of the head, one channel accesses the center of a dedicated servo track on the tape and at least two other channels will access the center of distinct data tracks.

U.S. Pat. No. 5,262,908 (incorporated herein by reference) relates to a tracking control device for a magnetic recording/reproducing apparatus arranged in such a manner that a head unit having a plurality of magnetic heads is successively moved in the widthwise direction of a magnetic tape for switching tracking positions so that data recording/reproducing is, by each of the plurality of magnetic heads, performed along a plurality of data tracks formed on the magnetic tape in parallel to a direction in which the magnetic tape moves.

U.S. Pat. No. 5,574,602 (incorporated herein by reference) relates to a magnetic tape drive. A magnetic head simultaneously senses plural track lateral position indicators to generate a like plurality of independently generated sensed position error signals. The sensed position error signals are combined to provide an output position error signal that drives a positioning system to position the magnetic head laterally of the length of the magnetic tape. The output position error signal represents an average of the position errors indicated by the sensed position error signals. The quality of the sensed position error signal is monitored, eliminating poor quality signals from the output position error signal for maintaining a quality servo control.

U.S. Pat. No. 5,450,257 (incorporated herein by reference) relates to a head-track orienting system for use in magnetic recording tape drives which automatically corrects for misalignment between the head assembly and a recorded servo track on the tape. Using a servo control loop, the system calculates head-track alignment error during operation of the tape drive and either pivots the head assembly or adjusts the tape cartridge to compensate for the error. Transverse head-track positioning mechanisms are also included in the system to locate and maintain a centered position of the heads on the servo track.

U.S. Pat. No. 5,602,703 (incorporated herein by reference) relates to a recording head for recording servo signals on a multi-track recording system. A full width write head records signals across the full width of a recording medium, and an erase head is used to erase nulls in the servo signal pattern.

It is known to pattern servo bands for different tape drives on different servo write heads. A problem with this is that custom servo write heads or servo writers are required for each type of tape drive. This involves development and production costs for each type of tape drive.

If only the servo bands for a particular type of tape drive are patterned into servo write heads of servo writers, the data track pattern is predefined when the tape is servo written, and cannot be changed by the tape drive.

SUMMARY OF THE INVENTION

The invention provides a tape head including a plurality of write elements and being configured to write servo code to a plurality of bands across substantially the entire width of a magnetic tape. One aspect of the invention provides a servo writer including such a tape head.

Another aspect of the invention provides a method comprising providing a tape having a width; and writing servo code on the tape using a servo writer. The servo writer is configured to transport the tape in a length direction normal to the width, and configured to write servo code in linear bands along the length of the tape. The bands together occupy substantially the entire width of the tape.

Another aspect of the invention provides a method comprising writing servo code on a tape having a width using a servo writer configured to transport the tape in a length direction normal to the width. The servo writer is configured to write servo code linearly in the direction of the length of the tape in bands spanning across substantially the entire width of the tape. Servo code is written on a second tape having a width using the same servo writer. At least one of the servo bands is erased using a first tape drive, separate from the servo writer, and a data track is written in its place. Using a second tape drive, different from the first tape drive, at least one of the servo bands is erased, and a data track is written in its place. In one aspect of the invention, the data track on the second tape is in a location, relative to width, different from the location of the data track on the first tape.

DESCRIPTION OF THE DRAWINGS

Preferred embodiments of the invention are described below with reference to the following accompanying drawings depicting examples embodying the best mode for practicing the invention.

DETAILED DESCRIPTION OF THE INVENTION

This disclosure of the invention is submitted in furtherance of the constitutional purposes of the U.S. Patent Laws "to promote the progress of science and useful arts". U.S. Constitution, Article 1, Section 8.

Figure 1:
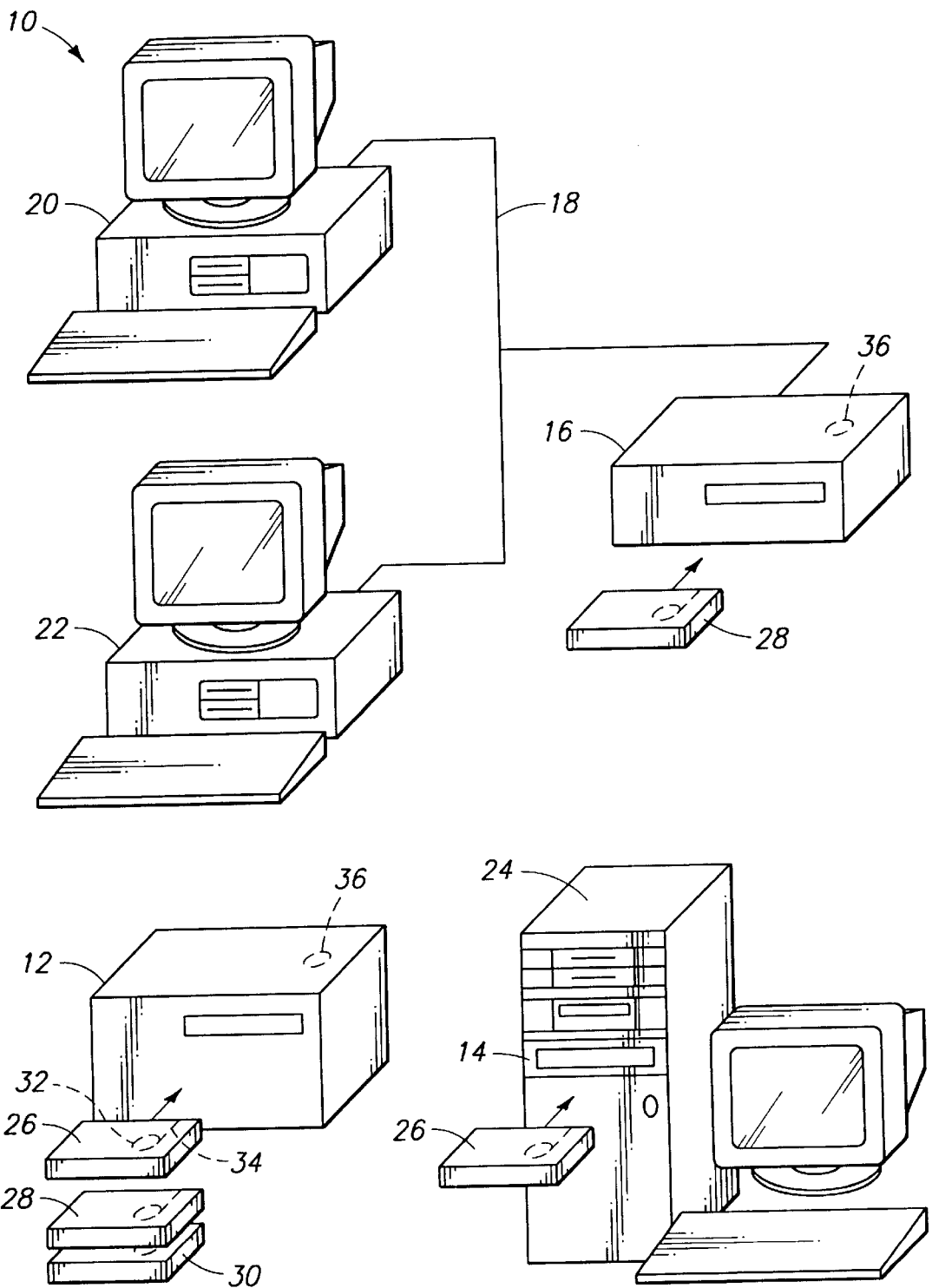
FIG. 1 is a perspective view of a system including a servo writer in accordance with one embodiment of the invention.

FIG. 1 shows a system 10. The system 10 includes a servo writer 12, and a plurality of drive units, such as tape drives 14 and 16. Although the invention is illustrated as being employed in connection with computer tape data storing in FIG. 1, the invention has a wide variety of applications. For example, some aspects of the invention can be used in connection with storage media other than tapes, or for storing either analog or digital music or information other than data. Some aspects of the invention can be embodied, for example, in connection with any of a variety of types of storage devices, including disk storage devices. For purposes of illustration, the invention will be described in connection with tape technology.

The drive units 14 and 16 respectively read data from and write data to tape or other form of magnetic storage media. The tape drives 14 and 16 can be coupled to networks or used with individual computers. For example, tape drive 16 is connected to a network 18 for communication with computers 20 or 22, and tape drive 14 is used with an individual computer 24. Further, the tape drive coupled to a network or used with an individual computer can be either a stand alone unit (separate from a computer) or can be configured to be received in a bay in a computer. For example, in the illustrated embodiment, tape drive 16 is a stand alone tape drive, and tape drive 14 is supported in a bay inside a housing of computer 24.

In the illustrated embodiment, the servo writer 12 and the tape drives 14 and 16 are used with tape cartridges 26, 28, or 30. In the illustrated embodiment, the tape cartridges are single reel type tape cartridges, and respectively include a housing supporting a reel 32, and tape 34 wound on the reel. A second reel 36 included in the servo unit 12 or in the tape drive 14 or 16 engages the tape. In an alternative embodiment, the tape cartridge includes two reels.

Figure 2:
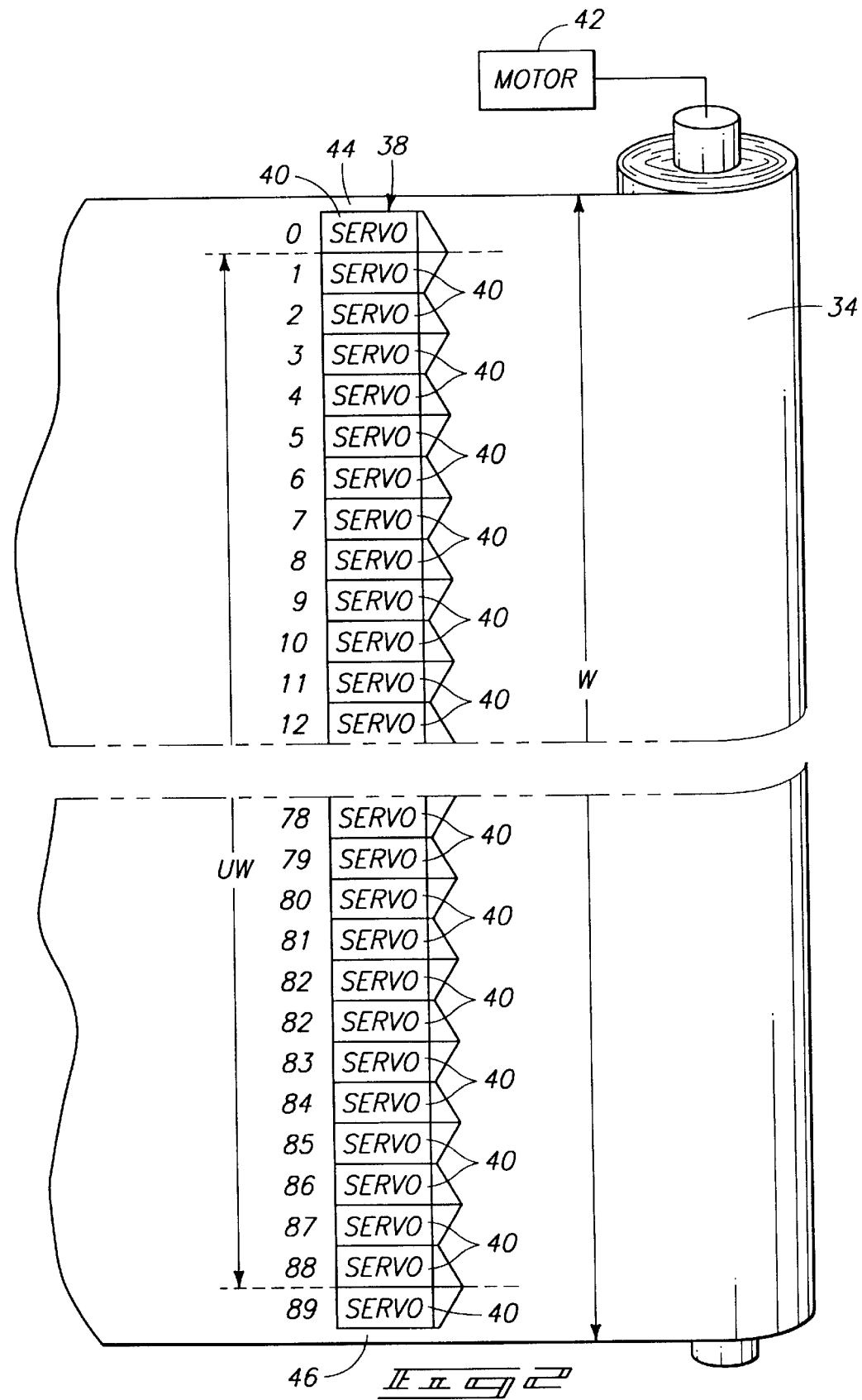
FIG. 2 is a diagrammatical view illustrating an arrangement of servo write elements of a servo writer in accordance with one embodiment of the invention, and illustrating servo bands on a tape.

In the illustrated embodiment, the respective tapes have a width W of one half inch (FIG. 2). The respective tapes also have a length in a direction perpendicular to the width W of the tape.

The servo writer 12 writes servo code to the tapes for subsequent use in a tape drive 14 or 16. The servo writer 12 includes a tape head 38 including a plurality of write elements 40. The head 38 is a patterned head which produces timing based servo patterns, as opposed to amplitude based servo patterns. The tape head 38 does not include erase elements; instead, the servo writer 12 includes a servo erase head (not shown) separate from the head 38. The write elements 40 of the servo writer 12 writes servo code to a plurality of bands 0–89 (FIG. 2) across substantially the entire width W of the tape 34. The bands 0–89 are adjacent to one another. In the illustrated embodiment, there are 90 servo bands. In alternative embodiments, the servo writer writes a different numbers of servo bands. In the illustrated embodiment, each servo band 0–89 has six tracks. In alternative embodiments, different numbers of tracks can be included in each servo band. The bands have respective widths in a direction parallel to the direction of the width W of the tape. The servo writer 12 simultaneously writes the servo code in the respective bands 0–89. In the illustrated embodiment, the servo writer 12 is a linear recording servo writer, and the tape drives 14 and 16 are linear recording tape drives. The servo writer 12 includes a motor 42 which transports the tape 34 in the length direction. The servo bands 0–89 are linear bands that extend in the direction of the length of the tape 34. The bands 0–89 together occupy substantially the entire width W of the tape.

More particularly, the tape 34 includes first and second edge strips or guard bands 44 and 46 separated by all of the adjacent bands 0–89. The guard bands 44 and 46 have no servo code. The guard bands 44 and 46 exist on either side of (i.e. are spaced apart by) the bands 0–89. The guard bands 44 and 46 have respective widths in a direction parallel to the direction of the width W of the tape. In the illustrated embodiment, the widths of the guard bands 44 and 46 are respectively less than the width of one of the bands 0–89. However, this is not a necessary requirement. The guard bands 44 and 46 can be any arbitrary width depending on how wide of an edge guard band is desired to avoid tape edge damage and cupping from degrading detection of servo code on the outer servo bands. In the illustrated embodiment, the strips 44 and 46 have respective widths which when combined are less than the width of one of the bands 0–89. The tape has a usable width UW that is less than the physical or actual width W of the tape 34.

In the illustrated embodiment, servo code is written in bands 0–89 that together extend beyond the usable width UW of the tape 34. More particularly, in the illustrated embodiment, bands 0 and 89 are beyond the usable width UW of the tape 34. The purpose of these extra bands 0 and 89 beyond the usable width UW is to avoid fringing effects at the outer extremes of the outer servo bands.

Figure 3:
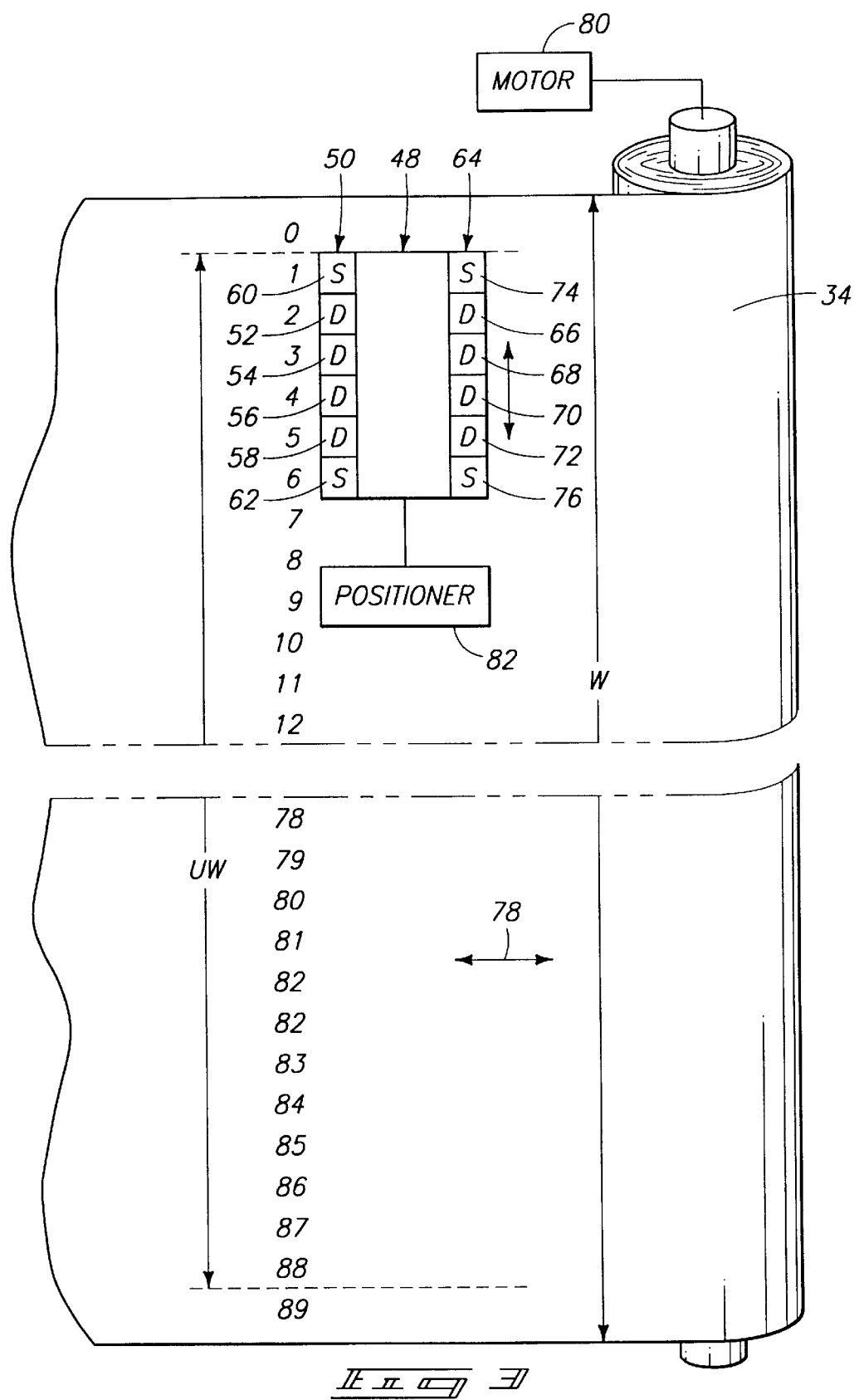
FIG. 3 is a diagrammatical perspective view illustrating an arrangement of servo elements and read/write elements in a tape drive different from the servo writer, which uses the tape of FIG. 2.
Figure 4:
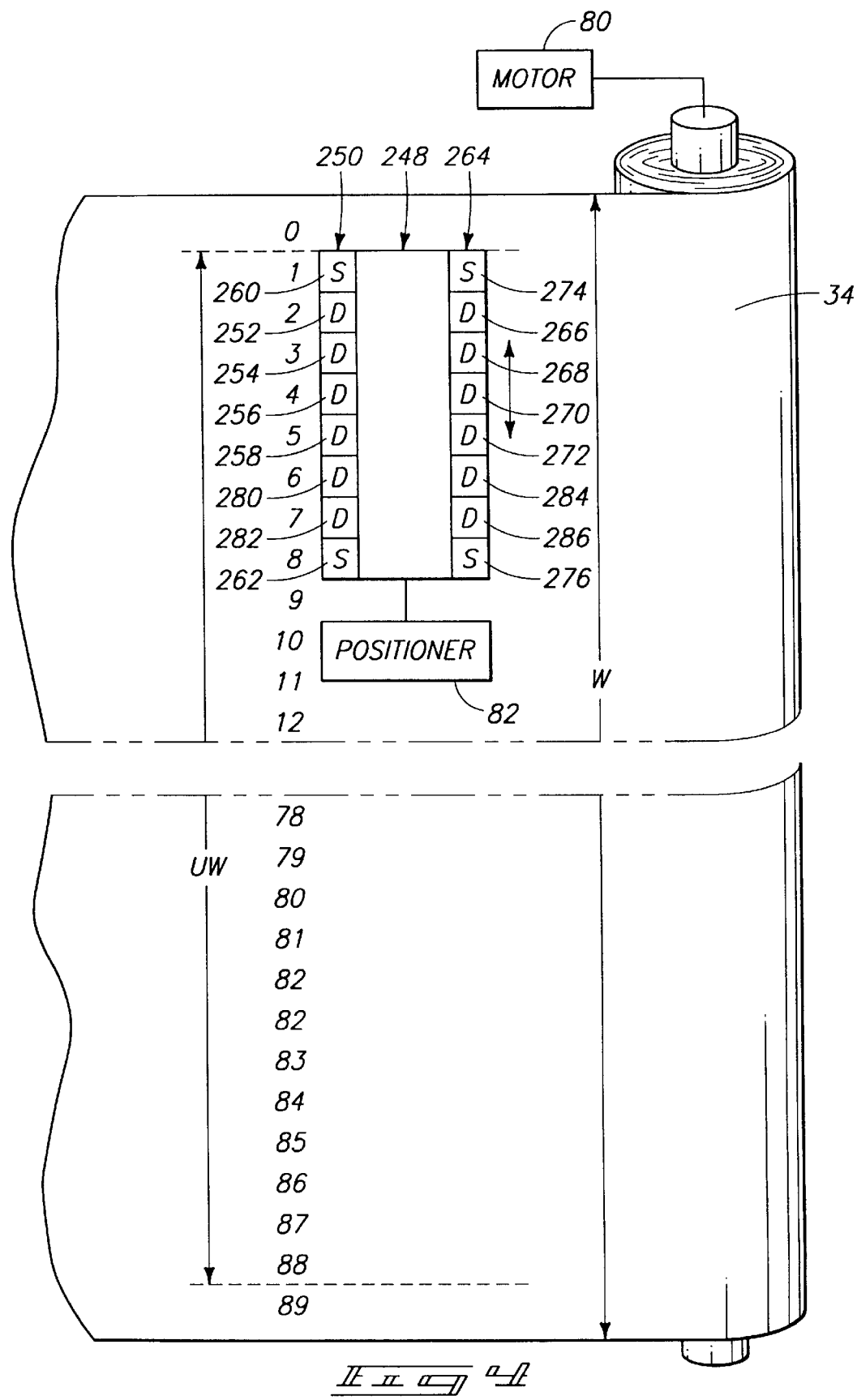
FIG. 4 is a diagrammatical perspective view illustrating an arrangement of servo elements and read/write elements in an alternative tape drive.

The tape drives 14 and 16 respectively erase at least one of the servo bands 0–89 when they receive tapes written on by the servo writer 12. The servo bands that are erased are those that are not needed by the particular design of tape drive. The servo bands are erased by read/write elements that will be described below. The tape drives 14 and 16 write data in respective positions 0–89 along the width W that previously contained servo code written by the servo writer 12 (FIGS. 3 and 4). The positions 0–89 will be referred to as bands when they contain servo code, and tracks when they contain data.

The tape drive 14 includes a tape head 48 having a first bump 50. A "bump" is an area on the head having a column of (read/write and/or servo) elements. It is called a "bump" because it typically protrudes relative to the rest of the head. However, the term "bump" as used herein is not to be construed so as to necessarily require protrusion relative to the rest of the head. The bump 50 includes a plurality of read/write elements 52, 54, 56, and 58 for reading data from or writing data to the tape in parallel tracks, and a plurality of servo elements 60, and 62 for reading servo code from the tape in parallel bands.

The tape head 48 further has a second bump 64 including a plurality read/write elements 66, 68, 70, and 72 for reading data from or writing data to the tape in the parallel tracks, and two servo elements 74 and 76 for reading servo code from the tape in parallel bands. The servo code is prewritten to the parallel bands by the servo writer 12.

In the illustrated embodiment, the first and second bumps 50 and 64 have four read/write elements, and two servo elements; however, in alternative embodiments, different numbers of read/write elements or servo elements can be employed. Further, in the embodiment of FIG. 3, the read/write elements and servo elements of the first and second bumps 50 and 64 are arranged with four read/write elements between two servo elements. Other arrangements are possible. Also, while other physical constructions are possible, in the illustrated embodiment, the servo elements are respectively of a physical construction identical to the physical construction of the read/write elements.

The tape drives 14 and 16 are configured to drive the length of the tape 34 in either of first and second directions relative to the head 48, as indicated by arrow 78. More particularly, the tape drives 14 and 16 include respective motors 80 that move the tape 34 relative to the head 48. For example, in the illustrated embodiment, one motor 80 drives one of the reels 32 or 36, and another motor (not shown) drives the other of the reels 32 or 36. In an alternative embodiment, a capstan drives the tape. The servo writer 12 may include conventional components such as tapes guides, etc.

The servo and read/write elements of the second bump 64 are respectively parallel to the servo and read/write elements of the first bump 50, as shown in FIG. 3. In one embodiment, when the tape is traveling in the first direction (e.g., to the right in FIG. 3) and it is desired to write to the tape, the servo element 74 of the second bump 64 reads servo code from the servo band 1 on the tape to produce a servo signal, the read/write element 52 of the first bump 50 erases servo code from band 2 and writes data in its place, the read/write element 66 of the second bump 66 reads data, the read/write element 54 of the first bump 50 erases servo code from band 3 and writes data in its place, the read/write element 68 of the second bump 64 reads data, the read/write element 56 of the first bump 50 erases servo code from band 4 and writes data in its place, the read/write element 70 of the second bump 64 reads data, the read/write element 58 of the first bump 50 erases servo code from band 5 and writes data in its place, the read/write element 72 of the second bump 64 reads data, and the servo element 76 of the second bump 64 reads servo code from the servo band 6 to produce a servo signal.

When the tape is traveling in the second direction (e.g., to the left in FIG. 3) and it is desired to write to the tape, the servo element 60 of the first bump 50 reads servo code from the servo band 1 on the tape to produce a servo signal, the read/write element 52 of the first bump 50 reads data from the track 2, the read/write element 66 of the second bump 64 writes data to the track 2, the read/write element 54 of the first bump 50 reads data from the track 3, the read/write element 68 of the second bump 64 writes data to the track 3, the read/write element 56 of the first bump 50 reads data from the track 4, the read/write element 70 of the second bump 64 writes data to the track 4, the read/write element 58 of the first bump 50 reads data from the track 5, the read/write element 72 of the second bump 64 writes data to the track 5, and the servo element 62 of the first bump 50 reads servo code from the servo band 6 to produce a servo signal.

FIG. 4 shows a head 248 in accordance with an alternative embodiment of the invention, wherein bump 250 includes eight read/write elements and two servo elements, and bump 264 includes eight read/write elements and two servo elements. More particularly, the first bump 250 of the head 248 includes servo elements 260 and 262, and read/write elements 252, 254, 256, 258, 280, and 282, and the second bump 264 of the head 248 includes servo elements 274 and 276, and read/write elements 266, 268, 270, 272, 284, and 286.

In the illustrated embodiment, the servo elements bracket the read/write elements, so tape defects of maximum widths can be tolerated. If one servo band on the tape is corrupted, the other servo band is used. Alternative embodiments are possible. For example, because servo code is pre-written onto the tape, and no servo write function is required in the tape drives 14 and 16, the number of servo elements in the heads 48 or 248 can be reduced. For example, servo elements 60 and 62 can be omitted from the head 48, and servo elements 260 and 262 can be omitted from the head 248.

The tape head 48 in the tape drive 14 (FIG. 3) is positioned in the direction of the width W in response to the servo code in at least one of the bands 0–89 written by the servo writer 12. More particularly, the tape drive 14 further includes a positioner 82 which is mechanically coupled to the head 48 and positions or moves the head 48 in the direction of the width W of the tape to move the head 48 between various positions for reading or writing to different tracks. For example, the head 48 of FIG. 3 could be moved to a position where servo element 60 is aligned with band 7 and servo element 62 is aligned with band 12, etc. The positioner 82 also moves the head 48 in the direction of the width of the tape to make minute corrections to ensure that the read/write elements are accurately positioned over desired tracks during reading or writing operations. In the illustrated embodiment, the positioner 82 comprises a voice coil motor; however, any other head positioner 82 known in the art can be employed.

In one embodiment, the tape drive is modified to write data in a position along the width different from the original position. Because the servo bands are not patterned for any particular product (i.e., for any particular design of tape drive), the data track pattern is not predefined and can be changed in a tape drive 14 or 16. For example, in one embodiment, the data track pattern for a tape drive 14 or 16 is changed in product firmware. In this embodiment, the physical structure of the servo elements is identical to the physical structure of the read/write elements.

In operation, servo code is written on multiple tapes 26, 28, and 30 using the servo writer 12. Different tape drives 14 and 16 use different of the servo bands written by servo writer. Using tape drive 16, a band on a tape 28 is erased in a different position from the band on the tape 26 erased by the tape drive 14. Using one tape drive 14, data is written in a track 2 on a tape 34 that previously contained servo code written by the servo writer 12. Using another tape drive 16, data is written in a track on the tape 30 that previously contained servo code written by the servo writer.

Figure 5:
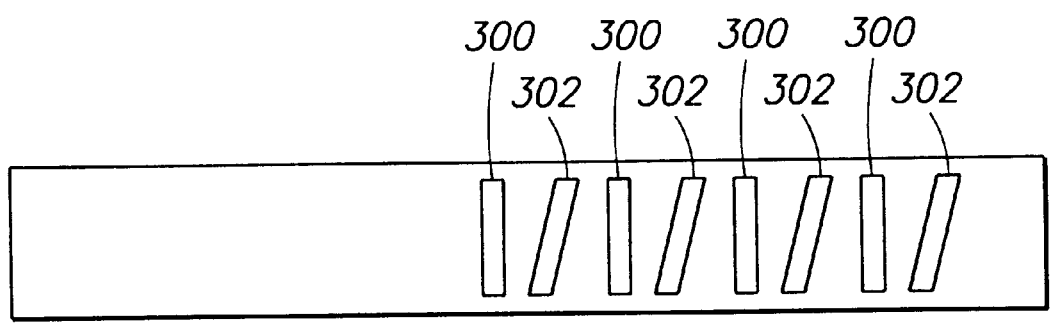
FIG. 5 is a diagrammatical view illustrating a servo pattern written on the tape of FIG. 2.

FIG. 5 illustrates a servo band configuration that could be employed in one embodiment of the invention for a servo band. This servo band configuration is a servo band configuration which provides both an indication of position (and speed) in the direction of travel of the tape, and an indication of lateral position of the tape relative to the servo element reading the servo band. The tape drives include a timing based demodulation scheme for sensing the servo information on the tape. The position of the head relative to the tape width is derived from the relative timing of azimuthally sloped transitions. The servo code thus includes two elements: synchronization transitions 300, which are written with a zero degree azimuth angle, and positioning transitions 302, which are written at some azimuth angle other than zero (e.g., written at ten degrees azimuth angle). The time difference between synchronization and positioning read back pulses generated using a servo element 60, 62, 74, 76, 260, 262, 274, or 276 is used to indicate the servo element's position in a servo band. By using a high resolution timing measurement, a high resolution position measurement is achieved. See European Patent Application EP 0690442 A2 for detailed information regarding servo systems that could be employed.

In an alternative embodiment, the pattern is written with one frequency on one side of the band, and another frequency on the other side of the band, and the position of the head in the direction of the width W of the tape is determined by the relative strengths of the two signals.

In one embodiment, the servo writer writes servo code using a servo pattern in one band that is the same as the servo pattern in another band. In another embodiment, the servo pattern in one band is different from the servo pattern in another band.

Thus, a servo write head design is provided that can be used to write servo code for a range of products (tape drives). By using a patterned servo write head to write the entire usable width of a tape in a single pass, the time required to perform the servo write task is minimized. Writing servo code at all possible locations across the tape with such a patterned servo write head can be done with no additional servo write time penalty and offers advantages over writing servo code only in bands across the tape where it will be used in a particular product (particular tape drive design).

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

What is claimed is:

1. A method comprising:

writing servo code on a tape having an overall width, and a usable width less than the overall width, using a servo writer configured to transport the tape in a length direction normal to the width, and configured to write servo code linearly in the direction of the length of the tape in bands, the servo code being written simultaneously in the respective bands, the bands together extending beyond the usable width of the tape;

writing servo code on a second tape having a width, using the same servo writer;

using a first tape drive, separate from the servo writer, erasing at least a lengthwise portion of at least one of the servo bands and writing a data track in its place, the erasing including erasing substantially the entire width of the servo band, wherein the data track has a position along the width of the tape corresponding to the position along the width of the tape where the erased servo band was located; and using a second tape drive, different from the first tape drive, erasing at least a lengthwise portion of one of the servo bands of the second tape, and writing a data track in its place, wherein the data track on the second tape is in a position, relative to the width, different from the position of the data track on the first tape.

2. A method in accordance with claim 1 wherein the width is one half inch and wherein the servo writer writes code in exactly ninety servo bands.

3. A method comprising:

writing servo code on a tape having a width, using a servo writer configured to transport the tape in a length direction normal to the width, and configured to write servo code linearly in the direction of the length of the tape in a plurality of bands; and using a first tape drive, separate from the servo writer, erasing at least a lengthwise portion of at least one of the servo bands and writing a data track in its place, the erasing including erasing substantially the entire width of the servo band, wherein the data track has a position along the width of the tape that is the same as the position along the width of the tape where the erased servo band was located.

4. A method in accordance with claim 3 and further comprising writing servo code on a second tape having a width, using the same servo writer; and, using a second tape drive, different from the first tape drive, erasing at least a lengthwise portion of one of the servo bands of the second tape, and writing a data track in its place, wherein the data track on the second tape is in a location, relative to the width, different from the location of the data track on the first tape.

5. A system comprising:

a servo writer configured to write servo code on a tape having a width, configured to transport the tape in a length direction normal to the width, and configured to write servo code linearly in the direction of the length of the tape in bands spanning across substantially the entire width of the tape; and a first tape drive, separate from the servo writer, configured to erase at least a lengthwise portion of at least one of the servo bands, including substantially the entire width of the servo band, and to write a data track in its place, wherein the first tape drive is configured to write the data track at a position along the width of the tape that is the same as the position along the width of the tape where the erased servo band was located.

6. A system in accordance with claim 5, wherein the servo writer includes a tape head consisting essentially of servo write elements.

7. A system in accordance with claim 5, wherein the servo writer is configured to write bands such that they are parallel to one another.

8. A system in accordance with claim 5, wherein the servo writer is configured to write bands such that they are adjacent to one another.

9. A system in accordance with claim 5, wherein the tape has a length in a direction normal to the width, wherein the servo writer includes a tape head, wherein the tape head is configured to write bands linearly along the length of the tape, wherein the tape head of the servo writer is configured such that the bands have respective widths and are adjacent to one another, wherein the tape includes first and second edge strips separated by the adjacent servo bands, the servo writer being configured to not write servo code on the first and second strips.

10. A system in accordance with claim 5, wherein the tape has an overall width, and has a usable width less than the first mentioned width, and the servo writer is configured to write the bands adjacent to one another such that the bands extend at least across the entire usable width of the tape.

11. A system in accordance with claim 5, and further comprising a second tape drive configured to erase at least a lengthwise portion of a different band than the band erased by the first mentioned tape drive.

* * * * *